Dec. 1, 1931.  S. RUBEN  1,833,914
ELECTRIC MOTOR
Filed Jan. 31, 1930   2 Sheets-Sheet 1
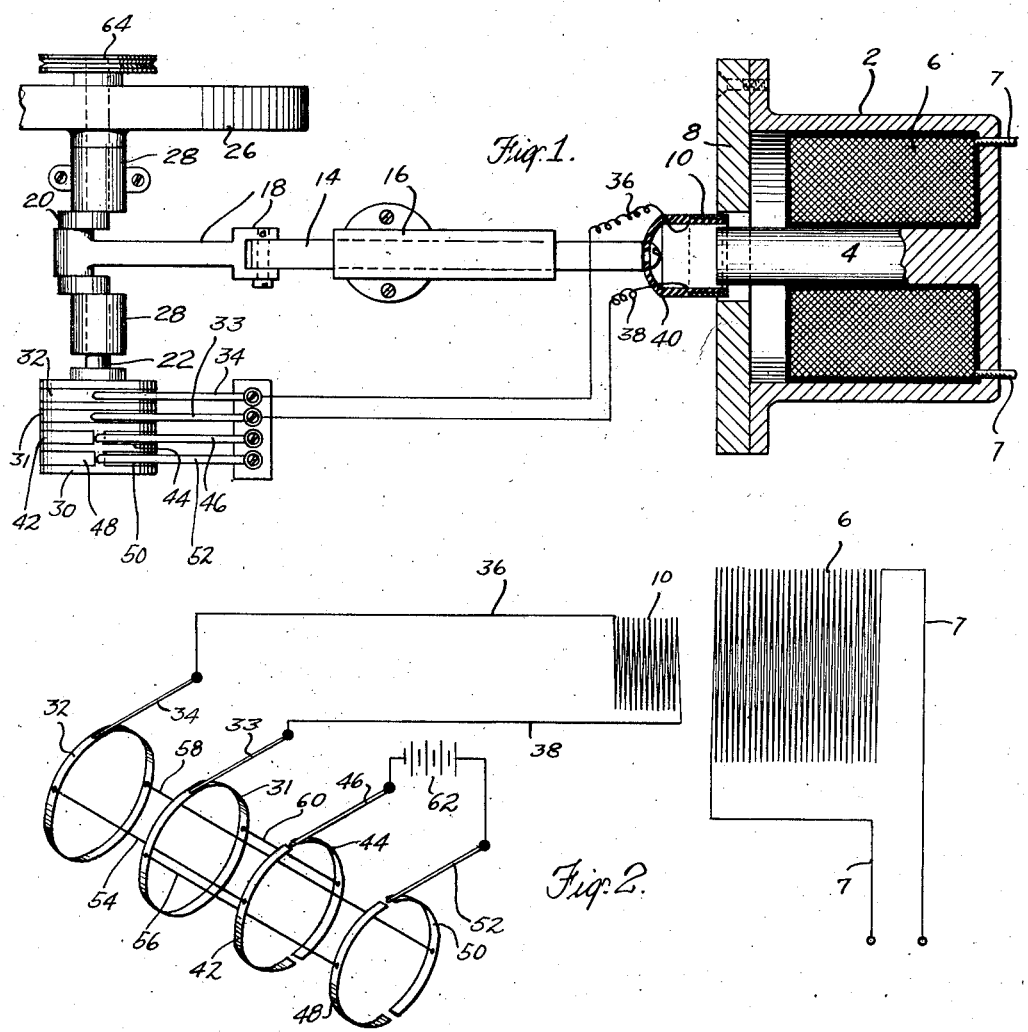
Samuel Ruben
INVENTOR
BY
ATTORNEY

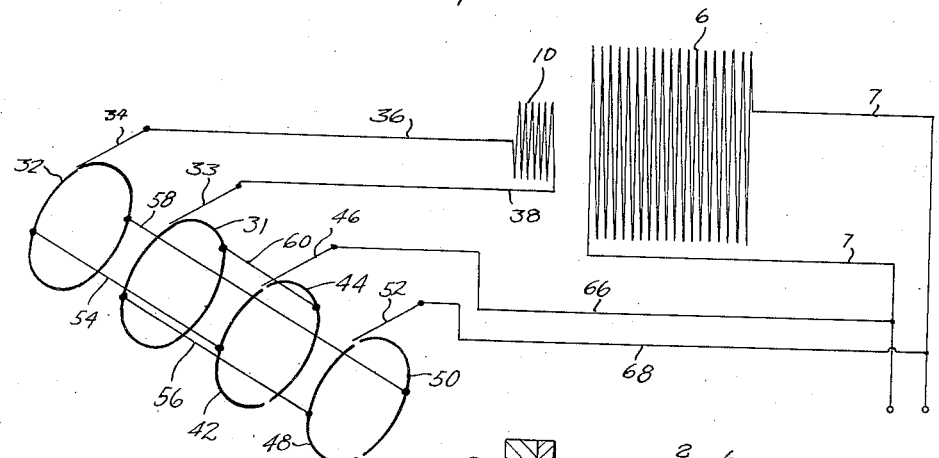

Patented Dec. 1, 1931

1,833,914

UNITED STATES PATENT OFFICE

SAMUEL RUBEN, OF NEW ROCHELLE, NEW YORK

ELECTRIC MOTOR

Application filed January 31, 1930. Serial No. 424,901.

This invention relates to an electric motor and more specifically to an electric motor of the reciprocating type having as its armature or moving element an inductance containing no ferromagnetic parts.

The chief object of my invention is to produce an electric motor of the reciprocating type capable of operation on alternating or direct current and having efficient operation at low speeds.

Another object is to allow operation on alternating current with greater starting torque, especially with fixed loads.

A further object is to allow operation with less noise and slower moving parts.

Other objects will be apparent from the disclosure.

In the present art, motors have usually been constructed with ferromagnetic moving elements which have considerable mass and inertia due to their form. This limitation is in a great measure removed by my invention.

In general, the principle involved in the design of my motor, is the use of a movable inductance located in a transversely related field so that the reaction between the electromagnetic field of the inductance and that of the transverse field causes the inductance element to be moved within and forced out of the field. This force is utilized to drive a crank shaft and by combination of a rotary switch, continuous action can be had. As the direction of motion of the moving inductance element depends upon the relation of its electromagnetic field to that of the stationary field, the direction of the force is changed by reversing of polarity of either one. As it appears more practical to reverse the polarity of the moving coil field, the rotary switch is in the nature of a polarity changer and the position of the pole changing segments is synchronized with the position of the moving coil in relation to the stationary field.

Thus when the moving coil is most distant in the stationary field, the polarity is changed by the switch to cause it to move out of the field and when sufficiently out, the polarity is again reversed to cause it to enter the stationary field.

Due to the fact that the moving coil need not have any magnetic materials, its weight is relatively low and as it need contain a low number of turns only, the current applied to it can be relatively high and its voltage low.

When direct current is used, the moving coil can be directly connected to the same source of voltage that energizes the stationary field, either as a shunt or series connection.

On alternating current, the low voltages and high current for operation of the moving coil field is preferably obtained from a secondary winding associated with the stationary field, so that the stationary field element also serves as a step down transformer. However, if desired, the voltage for the moving coil can be obtained from another transformer or directly from the same voltage supplying the field winding either as a shunt or series connection.

On alternating current, the field parts are preferably laminated and of transformer steel.

In order to more completely describe this invention, reference is made to the accompanying drawings in which Fig. I shows a schematic arrangement for this device when operated on direct current.

Fig. II illustrates one form of wiring for Fig. I.

Fig. III illustrates another wiring diagram applicable to Fig. I for operation on alternating or direct current.

Fig. IV illustrates the preferred structure when alternating current is used.

Fig. V illustrates the electrical connections where a structure as shown in Fig. IV is used.

Referring specifically to Fig. 1, (2) is an iron casting which serves as container for field coil (6) and also as a conductor for the magnetic path; (7) represents the leads from coil (6); (4) is the central pole of the field and ring plate (8) constitutes the other pole so that a dense magnetic field is maintained between in the annular gap space between plate (8) and rod (4). The diameter and thickness of rod (4) and plate (8) are such as to carry the necessary field flux; (10) is a copper wire coil wound on a bakelite support (40); (36) and (38) are flexible leads from coil (10); (16) is a bearing which supports rod (14) which rod transmits the force exerted by coil (10) to wrist pin (18) and crank shaft (20); (26) is a fly wheel for stabilization; (28) is the bearing for shaft (22); (30) is a bakelite form which has two slip rings (31) and (32) forced over it; (48), (50), (42) and (44) are segments extending around the surface of (30) to the extent of about 170°. (33) and (34) are brushes which connect with moving coil (10); (54), (56), (58) and (60) are leads connecting the segments with the slip rings; (62) is a source of voltage which may be the same as is applied to leads (7) or an independent source.

In Fig. III in which is shown the connections for operation by alternating or direct current, the leads (66) and (68) are shown connected to the field leads (7).

In Fig. IV, the structure is the same as described in Fig. I, except that a heavy wire secondary (72) with fewer turns than (6) is added, with terminal leads (76) and (74), leads (70) and (78) connecting with the field winding which element also serves as the primary winding for secondary (72).

Referring now to the operation of the device as shown in Fig. I, when the field coil (6) is energized the field between its poles in the annular gap maintained between core (4) and ring plate (8) reacts with the field of the moving coil (10) and causes it to move out of the field. This motion causes the switch to be rotated 180° which causes the polarity to be reversed as can be noted from the drawings and connections shown thereon, and causes the movable inductance (10) to be attracted into the field or move in an opposite direction until the switch is again rotated 180°. This reciprocatory motion transmitted to the crank shaft causes a rotary motion which is stabilized by fly wheel (26) so that continuous power is developed.

When operated on alternating current and using the secondary winding (72), the operation is the same except that the coil is energized inductively.

What is claimed is:

1. An electric motor comprising the combination of a device having a stationary field element, a movable armature consisting of an inductance wound on a nonmagnetic supporting member, said inductance being located between the annular pole pieces which form the magnetic air gap for the stationary field element so as to have its magnetic field transverse to the field between the pole pieces, with means for continuously producing a reciprocating motion of said inductance.

2. An electric motor comprising the combination of a device having a stationary field element, a movable armature consisting of an inductance wound on a nonmagnetic supporting member, said inductance being located between the annular pole pieces which form the magnetic air gap for the stationary field element so as to have its magnetic field transverse to the field between the pole pieces, with means for continuously producing a reciprocating motion of said inductance and translating said reciprocating motion into rotary motion.

3. An electric motor comprising the combination of a device having a stationary field element, a movable armature consisting of a movable inductance wound on a nonmagnetic supporting member, said inductance being located between the annular pole pieces which form the magnetic air gap for the stationary field element so as to have its magnetic field transverse to the field between the pole pieces, a switch capable of reversing the polarity of current applied to the inductance in respect to the field element so as to produce a reciprocating motion of said inductance and translating said reciprocating motion into a rotary motion.

4. In an electric motor, the combination of a device having a stationary field element having an associated secondary winding to energize a movable armature consisting of an inductance wound on a nonmagnetic supporting member, said inductions being located between the annular pole pieces comprising the magnetic air gap for the stationary field element so as to have its magnetic field transverse to the field between the annular pole pieces, means for continuously producing a reciprocating motion of said inductance and translating said reciprocating motion into rotary motion.

Signed at New York, in the county of New York and State of New York, this 30th day of January A. D. 1930.

SAMUEL RUBEN.